(12) United States Patent
Patil et al.

(10) Patent No.: US 11,636,498 B2
(45) Date of Patent: Apr. 25, 2023

(54) METHODS AND SYSTEMS FOR PREDICTING WAIT TIME OF QUEUES AT SERVICE AREA

(71) Applicant: Tata Consultancy Services Limited, Mumbai (IN)

(72) Inventors: Kunal Milind Patil, Mumbai (IN); Kaushal Balkrishna Govil, Mumbai (IN); Kedar Narayan Phadke, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 63 days.

(21) Appl. No.: 17/027,136

(22) Filed: Sep. 21, 2020

(65) Prior Publication Data
US 2021/0103941 A1 Apr. 8, 2021

(30) Foreign Application Priority Data
Oct. 3, 2019 (IN) .............................. 201921040090

(51) Int. Cl.
*G06Q 30/0202* (2023.01)
*G06N 20/00* (2019.01)
(Continued)

(52) U.S. Cl.
CPC ......... *G06Q 30/0202* (2013.01); *G06N 20/00* (2019.01); *G06V 20/53* (2022.01);
(Continued)

(58) Field of Classification Search
None
See application file for complete search history.

(56) References Cited

U.S. PATENT DOCUMENTS 8,010,402 B1 * 8/2011 Sharma ................. G06Q 10/00
705/7.29
8,224,028 B1 7/2012 Golan et al.
(Continued)

FOREIGN PATENT DOCUMENTS

JP 5958723 B2 7/2016

OTHER PUBLICATIONS

Karim et al., Customer and Target Individual Face Analysis for Retail Analytics, 2018 International Workshop on Advanced Image Technology (IWAIT) (pp. 1-4), Jan. 1, 2018 (Year: 2018).*

*Primary Examiner* — Patricia H Munson
*Assistant Examiner* — Chesiree A Walton
(74) *Attorney, Agent, or Firm* — Finnegan, Henderson, Farabow, Garrett & Dunner, LLP (57) ABSTRACT

This disclosure relates generally to methods and systems for predicting wait time of queues at service area such as market places including retail stores and super markets. The present methods and systems accurately predicts the wait times of the plurality of queues by utilizing various visual cues of the customers, along with the number of service items and the efficiency of the service operator. The visual cues including a demographic factor such as age, gender, ethnicity of the customer and a senti-motional factor such as sentiments including positive attitude or negative attitude and emotions of the customers including happy state, sad state, and irritation state of the customer. The customers may choose the queue having least predicted wait time and may take informed decision hoping for faster check-out, based on the predicted wait times of the queues. Hence, customer experience and customer satisfaction may be achieved.

5 Claims, 2 Drawing Sheets

(51) Int. Cl.
*G06V 20/52* (2022.01)
*G06V 40/16* (2022.01)
*G06Q 30/0204* (2023.01)

(52) U.S. Cl.
CPC ....... *G06V 40/161* (2022.01); *G06Q 30/0204* (2013.01); *G06V 40/178* (2022.01)

(56) References Cited

U.S. PATENT DOCUMENTS

| | | |
|---|---|---|
| 2009/0217315 A1 | 8/2009 | Malik et al. |
| 2009/0249342 A1* | 10/2009 | Johnson ................ G06Q 10/04 718/101 |
| 2013/0308755 A1 | 1/2013 | Kuo-Chu |
| 2013/0117695 A1* | 5/2013 | Hammoud ............. G06Q 50/10 715/761 |
| 2017/0053326 A1* | 2/2017 | SivasankaranNair ....................... G06Q 10/06393 |
| 2019/0080178 A1* | 3/2019 | To ...................... G06K 9/00771 |
| 2020/0104594 A1* | 4/2020 | Zucker .................. G06V 10/17 |

* cited by examiner

METHODS AND SYSTEMS FOR PREDICTING WAIT TIME OF QUEUES AT SERVICE AREA

PRIORITY CLAIM

This U.S. patent application claims priority under 35 U.S.C. § 119 to: Indian Patent Application No. 201921040090, filed on 3 Oct. 2019. The entire contents of the aforementioned application are incorporated herein by reference.

TECHNICAL FIELD

The disclosure herein generally relates to the field of service processing, and, more particularly, to methods and systems for predicting wait time of queues at service area.

BACKGROUND

In today's business competence, on-line shopping facilities are augmenting with ease of shopping experience and faster delivery facilities. Brick-and-mortar business service areas such as market places including retail stores and super markets, have been forced to come-up with innovative solutions to improve in-store customer experience, while competing with the on-line shopping facilities. One key challenge aspect that may affect customer experience and affect customer satisfaction to a great extent is on how to reduce wait time of the customers at service queue while checking-out from the service area.

Typically, the service areas may have a number of counters or check-out areas for providing a service to the customers. Customers may need to wait in a queue against the associated counter, for a significant amount of time before the service is processed by a service operator of the counter. The wait time in the queue may be increased when significant number of customers waiting in the queue increases, against insufficient number of counters. Sometimes the wait time, may go worse especially during weekends, ending up with a terrible waiting experience to the customers.

To beat heavy traffic of customers especially during weekends or festive seasons, management of the service area may come up with solutions by arranging separate counters for the customers having less number of shopping items or for the customers having coupons or prefers electronic payments, and so on. However these solutions may not be effective and sometimes cause operational inefficiencies. A customer who wishes to join the queue along with his/her shopping items may tend to opt the queue expecting less wait time, among the plurality of the queues. This may be possible for the customer by analyzing some of factors of each queue, such as a less number of customers waiting in the queue, a less number of shopping items with the customers waiting in the queue, and efficiency of service operator of the counter. Conventional solutions have considered some of these factors or combination of these factors to predict wait time of the queue, so that customers may make informed decision about which queue they can join hoping for faster check-out. Some conventional solutions have considered customer count related factors such as an average arrival rate of the customers to the service area, an average departure rate of the customers from the service area, and so on. However, the above disclosed factors are limited and may often lead to inaccurate wait time prediction, in turn degrading the customer experience.

SUMMARY

Embodiments of the present disclosure present technological improvements as solutions to one or more of the above-mentioned technical problems recognized by the inventors in conventional systems. For example, in one embodiment, a processor-implemented method for predicting wait time of each queue of a plurality of queues at service area is provided. The method comprising the steps of: receiving, via one or more hardware processors, an image of the each queue of the plurality of queues, using at least one image acquisition device, wherein the each queue comprising a plurality of customers waiting in the queue along with associated service items carts for a service; extracting, via the one or more hardware processors, a set of sub-images for each customer among the plurality of customers, from received image of the each queue, using a pre-trained deep learning based recognition model, wherein the set of sub-images for the each customer comprises a face of the customer and the associated service items cart; estimating, via the one or more hardware processors, an age and a senti-motional state of the each customer from the face of the customer comprised in the corresponding set of sub-images, and a number of service items from the associated service items cart comprised in the corresponding set of sub-images, using the pre-trained deep learning based recognition model; determining, via the one or more hardware processors, a demographic factor (D) of the each customer based on the corresponding estimated age, a senti-motional factor (S) of the each customer based on the corresponding estimated senti-motional state, and a service items cart load factor (L) of the each customer based on the estimated number of service items; calculating, via the one or more hardware processors, a service time (T) for the each customer, based on the corresponding demographic factor (D), the corresponding senti-motional factor (S) and the average efficiency (E) of the service operator; and predicting the wait time of the each queue of the plurality of queues, via the one or more hardware processors, based on the service time of the plurality of customers waiting in the associated queue for the service.

In another aspect, a system for predicting wait time of each queue of a plurality of queues at service area is provided. The system comprising: a memory storing instructions; one or more communication interfaces; an at least one image acquisition devices; and one or more hardware processors coupled to the memory via the one or more communication interfaces, wherein the one or more hardware processors are configured by the instructions to: receive an image of the each queue of the plurality of queues, using the at least one image acquisition devices, wherein the each queue comprising a plurality of customers waiting in the queue along with associated service items carts for a service; extract a set of sub-images for each customer among the plurality of customers, from received image of the each queue, wherein the set of sub-images for the each customer comprises a face of the customer and the associated service items cart, using a pre-trained deep learning based recognition model; estimate an age and a senti-motional state of the each customer from the face of the customer comprised in the corresponding set of sub-images, and a number of service items from the associated service items cart comprised in the corresponding set of sub-images, using the pre-trained deep learning based recognition model; determine a demographic factor (D) of the each customer based on the corresponding estimated age, a senti-motional factor (S) of the each customer based on the corresponding estimated senti-motional state, and a service items cart load factor (L) of the each customer based on the estimated number of service items; calculate a service time (T) for the each customer, based on the corresponding demographic factor (D), the corresponding senti-motional factor (S) and the average efficiency (E) of the service operator; and predict the wait time of the each queue of the plurality of queues, based on the service time of the plurality of customers waiting in the associated queue for the service.

In yet another aspect, there is provided a computer program product comprising a non-transitory computer readable medium having a computer readable program embodied therein, wherein the computer readable program, when executed on a computing device, causes the computing device to: receive an image of the each queue of the plurality of queues, using the at least one image acquisition devices, wherein the each queue comprising a plurality of customers waiting in the queue along with associated service items carts for a service; extract a set of sub-images for each customer among the plurality of customers, from received image of the each queue, wherein the set of sub-images for the each customer comprises a face of the customer and the associated service items cart, using a pre-trained deep learning based recognition model; estimate an age and a senti-motional state of the each customer from the face of the customer comprised in the corresponding set of sub-images, and a number of service items from the associated service items cart comprised in the corresponding set of sub-images, using the pre-trained deep learning based recognition model; determine a demographic factor (D) of the each customer based on the corresponding estimated age, a senti-motional factor (S) of the each customer based on the corresponding estimated senti-motional state, and a service items cart load factor (L) of the each customer based on the estimated number of service items; calculate a service time (T) for the each customer, based on the corresponding demographic factor (D), the corresponding senti-motional factor (S) and the average efficiency (E) of the service operator; and predict the wait time of the each queue of the plurality of queues, based on the service time of the plurality of customers waiting in the associated queue for the service.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Brick-and-mortar business service areas such as market places including retail stores and super markets, have been forced to come-up with innovative solutions to improve in-store customer experience. Some innovative solutions may be to reduce wait time of the customers waiting at service queue against a service counter or check-out area while checking-out from the service area. Conventional solutions have considered some of factors and combination of the factors to predict wait time of the queue, so that customers may make informed decision about which queue they can join hoping for faster check-out. Some of the factors including, a less number of customers waiting in the queue, a less number of shopping items with the customers waiting in the queue and efficiency of service operator of the counter, and customer count related factors such as an average arrival rate of the customers to the service area, an average departure rate of the customers from the service area. However, the above disclosed factors are limited and may not often predict the accurate wait time of the queues.

Various embodiments disclosed herein provide methods and systems for predicting wait time of each queue of a plurality of queues at service area, solves the challenges of predicting more accurate wait time of the queues. The present disclosure utilizes various visual cues of the customers waiting in the queue, in addition to the factors considered by some conventional solutions. The visual cues including a demographic factor such as age, gender, ethnicity of the customer and a senti-motional factor such as sentiments including positive attitude or negative attitude and emotions of the customers including happy state, sad state, and irritation state of the customer and so on.

In accordance with the present disclosure, the visual cues may play important role in improving the accuracy of the wait time prediction since visual cues capture facts and observations of the customers waiting in the plurality of queues in real time. Some of the facts and the observations include: (i) a queue with a quarrelsome customer or a customer with sad or irritation face may tend to take more time during the check-out (ii) queues on the left side of the check-out area are usually less crowded and the queues which are directly visible at the check-out area are usually more crowded (iii) young age customers may usually shop less items and is quick to pay using latest payment technologies and (iv) old age customers may take more time than the young age customers during a check-out process.

In the context of the present disclosure, the brick-and-mortar business service areas include retail stores, super markets, shopping malls, or any other business areas where consumer items or products are available for sale. The consumer items, consumer products or service items refer to the products that are available for the customers. The products include but are not limited to the products consumed by the customers, electronic goods, wearable items, utility products, and so on. The business areas may provide a different variety of carriers, so that the customers may place the selected products. The different variety of carriers are normally moveable and may be referred with different names such as shopping cart, service items cart, a bag, a basket, trolley and so on.

The business areas may typically provide at least one counter or a transaction area or a check-out area and assigned each by a service operator. The customers may typically have to pass through these counters by paying an associated amount to the service operator, in order to go out of the service area. As the number of counters are normally limited, the customers along with their associated service items carts have to wait in the queue against the counter for their turn towards check-out area. A typical job (may be termed as 'a service' or 'a transaction', or 'a check-out process' or a like) of the service operator is to scan each product or the item present in the service items cart and collect payment from the associated customer based on the number of products or the items present in the service items cart. The job of the service operator may also include greeting each customer and accepting various modes of payment.

Figure 1:
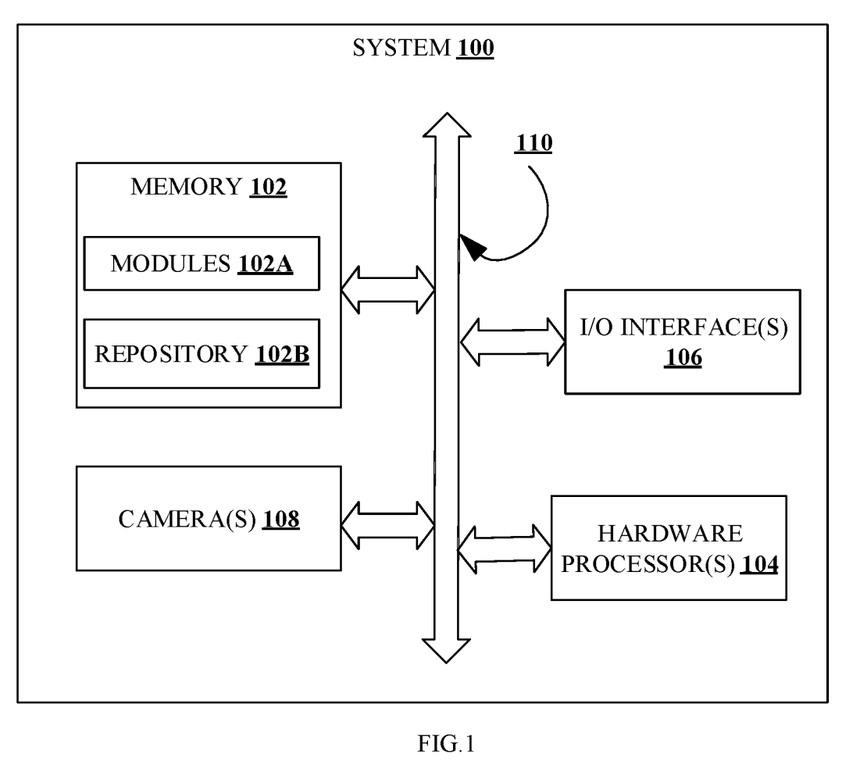
FIG. 1 is a functional block diagram of a system for predicting wait time of each queue of a plurality of queues at service area, according to some embodiments of the present disclosure.
Figure 2:
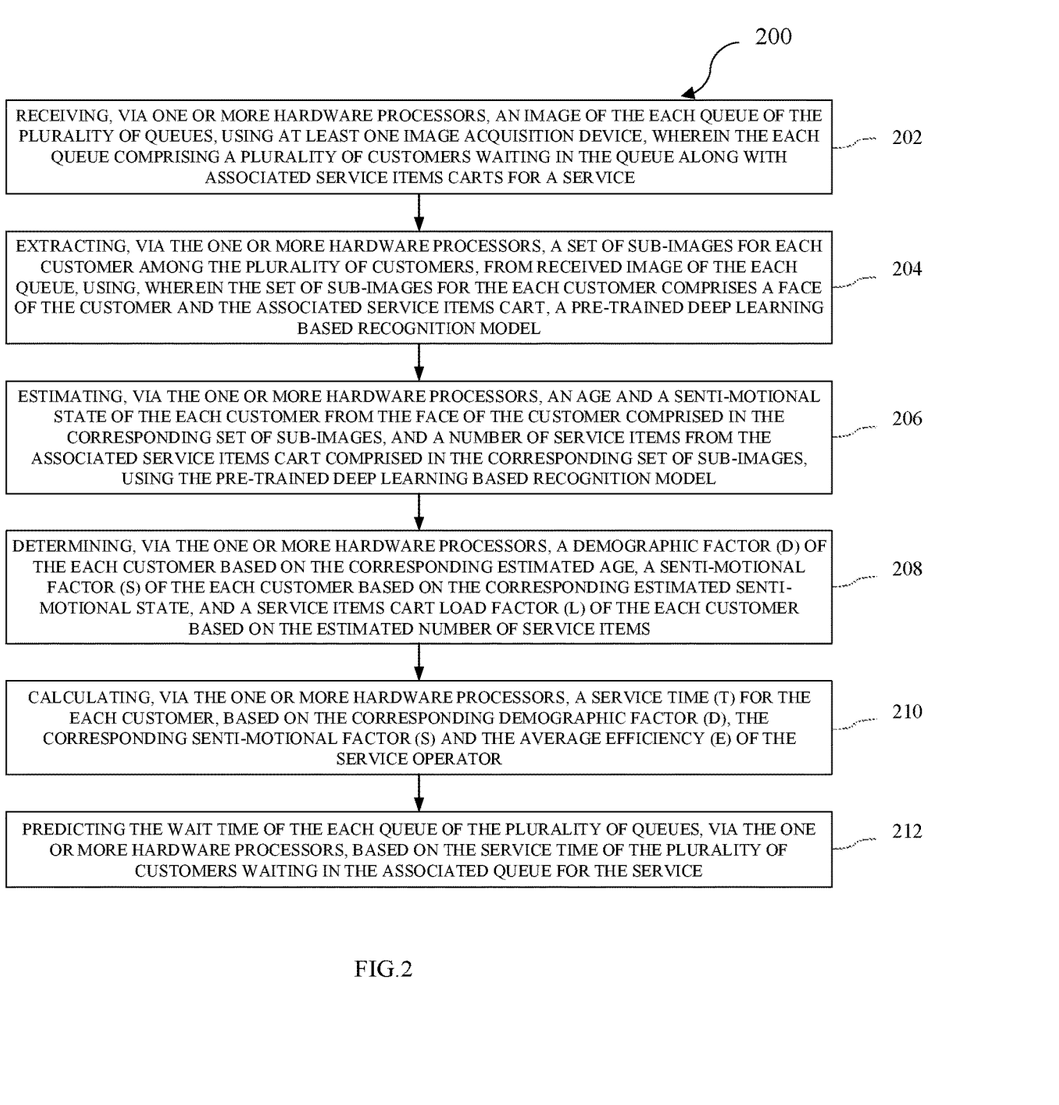
FIG. 2 illustrates an exemplary flow diagram of a processor-implemented method for predicting wait time of each queue of a plurality of queues at service area, according to some embodiments of the present disclosure.

Referring now to the drawings, and more particularly to FIG. 1 through FIG. 2, where similar reference characters denote corresponding features consistently throughout the figures, there are shown preferred embodiments and these embodiments are described in the context of the following exemplary systems and/or methods.

FIG. 1 is a functional block diagram of a system 100 for predicting wait time of each queue of a plurality of queues at service area, according to some embodiments of the present disclosure. In an embodiment, the system 100 includes or is otherwise in communication with one or more hardware processors 104, communication interface device(s) or input/output (I/O) interface(s) 106, an at least one image acquisition device(s) or camera(s) 108, and one or more data storage devices or memory 102 operatively coupled to the one or more hardware processors 104. The one or more hardware processors 104, the memory 102, the I/O interface(s) 106, and the at least one image acquisition device(s) 108 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102A and a repository 102B for storing data processed, received, and generated by one or more of the plurality of modules 102A. The plurality of modules 102A may include routines, programs, objects, components, data structures, and so on, which perform particular tasks or implement particular abstract data types.

The plurality of modules 102A may include programs or computer-readable instructions or coded instructions that supplement applications or functions performed by the system 100. The plurality of modules 102A may also be used as, signal processor(s), state machine(s), logic circuitries, and/or any other device or component that manipulates signals based on operational instructions. Further, the plurality of modules 102A can be used by hardware, by computer-readable instructions executed by the one or more hardware processors 104, or by a combination thereof. In an embodiment, the plurality of modules 102A can include various sub-modules (not shown in FIG. 1). Further, the memory 102 may comprise information pertaining to input(s)/output(s) of each step performed by the processor(s) 104 of the system 100 and methods of the present disclosure.

The repository 102B may include a database for storing images acquired by the at least one image acquisition device(s) 108. Further, the repository 102B amongst other things, may serve as a database for storing the data that is processed, received, or generated as a result of the execution of the plurality of modules 102A.

Although the repository 102B is shown internal to the system 100, it will be noted that, in alternate embodiments, the repository 102B can also be implemented external to the system 100, where the repository 102B may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102B may be distributed between the system 100 and the external database.

Although the at least one image acquisition device(s) 108 is (are) shown internal to the system 100, it will be noted that, in alternate embodiments, the at least one image acquisition device(s) 108 can also be implemented external to the system 100, where the at least one image acquisition device(s) 108 may be connected to the system 100 externally via the I/O interface(s) 106. The components and functionalities of the system 100 are described further in detail with reference to FIG. 2.

Referring to FIG. 2, components and functionalities of the system 100 are described in accordance with an example embodiment of the present disclosure. FIG. 2 illustrates an exemplary flow diagram of a processor-implemented method 200 for predicting wait time of each queue of a plurality of queues at service area, according to some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 202 of the method 200, the one or more hardware processors 104 of the system 100 are configured to receive an image of each queue of the plurality of queues using the at least one image acquisition device(s) 108. In an embodiment, the at least one image acquisition device (s) 108 may be installed to acquire the images of the plurality of queues comprised in the service area. In another embodiment, each image acquisition device of the at least one image acquisition device (s) 108 may be installed at each queue of the plurality of queues comprised in the service area.

In an embodiment, the at least one image acquisition device (s) 108 may be installed at a position such that coverage area of the at least one image acquisition device (s) 108 may be at least include the plurality of customers waiting at one queue along with their associated service items carts. In another embodiment, the at least one image acquisition device (s) 108 may be installed at a position such that coverage area of the at least one image acquisition device (s) 108 may include the plurality of customers waiting at the plurality of queues along with their associated service items carts. In an embodiment, the at least one image acquisition device (s) 108 may be configured with a face recognition feature and a service items cart recognition feature. In an embodiment, the service items carts may have same or different physical characteristics including a shape, a style, a size, a structure, a design and so on. In an embodiment, acquired images by the at least one image acquisition device (s) 108 may be stored in the repository 102B of the memory 102.

At step 204 of the method 200, the one or more hardware processors 104 of the system 100 are configured to extract a set of sub-images for each customer among the plurality of customers, from received image of the each queue. In an embodiment, the set of sub-images for the each customer, include a face of the customer and the associated service items cart. In an embodiment, a pre-trained deep learning based recognition model is used to extract the set of sub-images for each customer, from the received image of the each queue. In an embodiment, the set of sub-images for each customer may be stored in the repository 102B of the memory 102. In an embodiment, one or more pre-processing operations may be performed on the acquired images by the at least one image acquisition device (s) 108. In an embodiment, the one or more pre-processing operations including scaling, rotation, merging, smoothing, image enhancement and so on.

In an embodiment, the pre-trained deep learning based recognition model is built based on supervised machine learning algorithms. In an embodiment, the method utilizes a pre-trained face recognition model to extract the face of the each customer present in each queue and to determine a number of customers present in each queue based on the number of extracted faces of the plurality of customers present in the queue. In an embodiment, the pre-trained deep learning based recognition model includes a service items cart recognition module to recognize the service items cart carried by the associated customer. In an embodiment, the pre-trained face recognition model and the service items cart recognition module may interact with each other to map the recognized service items carts with the associated customer.

At step 206 of the method 200, the one or more hardware processors 104 of the system 100 are configured to estimate an age, a senti-motional state, and a number of service items of the each customer. In an embodiment, the age of the each customer is estimated from the face of the customer captured in the corresponding set of sub-images. In an embodiment, the senti-motional state of the each customer is estimated from the face of the customer present in the corresponding set of sub-images. In an embodiment, the senti-motional state of the customer is one of the senti-motional state from a set of senti-emotional states including 'sad', 'neutral' and 'happy'. The senti-emotional state of the customer refers to sentiments of the customer including a positive attitude or a negative attitude expressed through a facial expression and gestures, and emotions of the customers including happiness, sadness, neutral, irritation and so on that may be predicted from the facial expression of the associated customer.

In an embodiment, the number of service items of the customer is estimated from the associated service items cart present in the corresponding set of sub-images. In an embodiment, the number of service items of the customer is estimated based on whether the associated service items cart is full, half-full or almost empty.

In an embodiment, the pre-trained deep learning based recognition model is used to estimate the age, the senti-motional state, and the number of service items of the each customer. In an embodiment, the pre-trained deep learning based recognition model includes a pre-built demographics prediction model to estimate the age of the each customer along with an accuracy age estimate factor, based on the face of the customer. In an embodiment, the pre-built demographics prediction model is pre-trained with a training dataset of human faces. In an embodiment human faces of the training dataset are labeled with associated ages. In an embodiment, the accuracy age estimate factor is a percentage that defines the accuracy of the prediction of the pre-built demographics prediction model. For example, if the accuracy age estimate factor is 99%, then the estimated age by the pre-built demographics prediction model is more accurate and if the accuracy age estimate factor is less than 50%, then the estimated age by the pre-built demographics prediction model is less accurate and such estimated ages may not be considered.

In an embodiment, the pre-trained deep learning based recognition model includes a pre-built senti-motional prediction model to estimate the senti-motional state of the each customer. In an embodiment, the pre-built senti-motional prediction model is pre-trained with a training dataset of human faces having a plurality of facial features. In an embodiment, the human faces having the plurality of facial features of the training dataset are labeled with associated senti-motional states.

In an embodiment, the pre-trained deep learning based recognition model includes a pre-built shopping cart recognition model to estimate a number of service items of the each customer. In an embodiment, the pre-built shopping cart recognition model is pre-trained with a training dataset of service item carts. In an embodiment, the service item carts of the training dataset includes different depth coverage area or of different densities that are labelled appropriately as whether the service items cart full, half-full or almost empty.

In an embodiment, the number of service items of the customer are predicted based on the associated service items cart whether is full, half-full or almost empty. For example, the number of service items of the customer may be less than or equal to 10 if the associated service items cart is almost empty, the number of service items of the customer may be between 10 to 30 if the associated service items cart is half-full, and the number of service items of the customer may be above 30 if the associated service items cart is full or almost full.

At step 208 of the method 200, the one or more hardware processors 104 of the system 100 are configured to determine a demographic factor (D) of the each customer, a senti-motional factor (S) of the each customer and a service items cart load factor (L) of the each customer. In an embodiment, the demographic factor (D) of the each customer is determined from a predefined set of demographic factors. Each demographic factor of the predefined set of demographic factors is defined based on a predefined range of the estimated age. Table. 1 shows an exemplary mapping between the predefined range of the estimated age and the predefined set of demographic factors. In the exemplary Table. 1, the estimated age of the customers having '40 and above' with the associated accuracy age estimate factor greater than or equal to 50% are classified as 'old' and the predefined demographic factor (D) is '1.1'. Similarly, the estimated age of the customers having 'less than 40' with the associated accuracy age estimate factor greater than or equal to 50% are classified as 'young' and the predefined demographic factor (D) is '0.9'. If the accuracy age estimate factor of the customers estimated by the pre-built demographics prediction model of the pre-trained deep learning based recognition model is less than '50%', then such customers are classified as 'neutral' and the predefined demographic factor (D) is '1'.

It may be noted from the Table. 1, in the mapping that 'young' classified customers are assigned with less demographic factor compared to the 'old' classified customers. The range of (0.9-1.1) predefined set of demographic factors is defined based on historical transactions observed for the plurality of service areas and a trial and error method. Also, being the fact and assumption that the 'young' classified customers are normally active and provide a quick action and response compared to the 'old' classified customers. It may be understood for the person skilled in the art that the mapping of the predefined range of the estimated age and the predefined set of demographic factors mentioned in the Table. 1 are exemplary and do not limit the scope of the invention. The skilled person in the art may exercise different mappings between the predefined range of the estimated age and the predefined set of demographic factors, may be by using different demographics prediction models.

TABLE.1

| Customer Classification | Predefined range of the estimated age/accuracy age estimate factor | Predefined demographic factor (D) |
| --- | --- | --- |
| Old | 40 and above | 1.1 |
| Neutral | Accuracy age estimate factor less than 50% | 1 |
| Young | less than 40 | 0.9 |

In an embodiment, the senti-motional factor (S) of the each customer is determined from a predefined set of senti-motional factors. Each senti-motional factor (S) of the predefined set of senti-motional factors is defined based on the set of senti-motional states. Table. 2 shows an exemplary mapping between the predefined set of senti-motional factors and the set of senti-motional states including 'sad', 'neutral', and 'glad'. In the exemplary Table. 2, the customers with the estimated senti-motional state 'sad' are assigned with the senti-motional factor (S) of '1.1'. Similarly, the customers with the estimated senti-motional state 'neutral' are assigned with the senti-motional factor (S) of '1', and the customers with the estimated senti-motional state 'glad' are assigned with the senti-motional factor (S) of '0.9'.

It may be noted from Table. 2, in the mapping that the customers having the estimated senti-motional state 'sad' are assigned with more senti-motional factor value compared to the customers having the estimated senti-motional state 'glad'. The range of (0.9-1.1) predefined set of senti-motional factors is defined based on historical transactions observed for the plurality of service areas and a trial and error method. Also, being the fact and assumption that the customers having the senti-motional state 'glad' may be cooperative and be pleasant with the service operator and may provide quick action and response, compared to the 'customers having the senti-motional state 'sad'.

It may be understood for the person skilled in the art that the mapping between the predefined set of senti-motional factors and the set of senti-motional states mentioned in the Table. 2 are exemplary and do not limit the scope of the invention. The skilled person in the art may exercise different mappings and may add other senti-motional states such as happy, very happy, sad, very sad and so on, and may be by using different senti-motional prediction models.

TABLE.2

| Senti-motional states | Predefined senti-motional factors (S) |
| --- | --- |
| Sad | 1.1 |
| Neutral | 1 |
| Glad | 0.9 |

In an embodiment, the service items cart load factor (L) of the each customer is determined from a predefined set of service items cart load factors. Each service items cart load factor of the predefined set of service items cart load factors is defined based on a predefined range of the estimated number of service items. Table. 3 shows an exemplary mapping between the predefined range of the estimated number of service items and the predefined set of service items cart load factors. In the exemplary Table. 3 example, the customers with the number of service items are lesser or equal to 10 are assigned with the service items cart load factor (L) as '10' and the associated service items cart is classified as 'almost empty'. Similarly, the customers with the number of service items in the range of 11 to 30 are assigned with the service items cart load factor (L) as '30' and the associated service items cart is classified as 'half-full', and the customers with the number of service items in the range of 31 to 50 are assigned with the service items cart load factor (L) as '50' and the associated service items cart is classified as 'full'. The range of (10-50) predefined set of service items cart load factors is defined based on historical transactions observed for the plurality of service areas and a trial and error method.

It may be understood for the person skilled in the art that the mapping between the predefined range of the estimated number of service items and the predefined set of service items cart load factors in the Table. 3 are exemplary and do not limit the scope of the invention. The skilled person in the art may exercise different mappings and may consider different range of the estimated number of service items and may be by using different trained shopping cart recognition models.

TABLE.3

| Predefined range of the estimated number of service items | Service items cart status | Predefined service items cart load factors (L) |
|---|---|---|
| 1-10 | Almost empty | 10 |
| 11-30 | Half-full | 30 |
| 31-50 | Full | 50 |

At step 210 of the method 200, the one or more hardware processors 104 of the system 100 are configured to calculate a service time (T) for the each customer waiting in the each queue, based on the corresponding demographic factor (D), the corresponding senti-motional factor (S) and the average efficiency (E) of the service operator. In an embodiment, the average efficiency (E) of the service operator may be determined based on a corresponding service history and the service items cart load factor (L) of the each customer. In an embodiment, the average efficiency (E) of the service operator is determined from the corresponding service history, based on an average time ($E_1$) taken by the service operator to process a service item from a plurality of service items processed for the plurality of customers in the past, an average time ($E_2$) taken by the service operator to greet and pay for each customer in the past, and the service items cart load factor (L) of the each customer served in the past. In an embodiment, the service history corresponding to the services by the service operator to the plurality of customers in his/her tenure of the service area.

In an embodiment, the average time ($E_1$) taken by the service operator to process a service item may be 2 to 3 seconds (typically for scanning the service item). However the average time ($E_1$) taken by the service operator to process a service item, may be effectively calculated based on the corresponding service history of the service operator. In an embodiment, the average time ($E_1$) taken by the service operator to process a service item may be calculated based on the corresponding service history comprising timestamp information, number of customers the service operator had served in the past and the number of service item carts associated with the number of customers. Mathematically, the average time ($E_1$) is calculated according to a below relation:

$$E_1 = \left[ \frac{\left( \frac{(t_l - t_f)}{n} \right)}{N} \right]$$

where f refer to timestamp of first scan of the customer, $t_l$ refer to timestamp of last scan of the customer, n refer to the number of service items comprised in the associated service items cart of the each customer and N refer to number of customers served by the service operator.

Also, the service operator may consume some time for greeting the customer and for making the payment transaction. The average time ($E_2$) taken by the service operator to greet and pay per customer may typically be 40 secs to 60 secs. However, the average time ($E_2$) taken by the service operator to greet and pay per customer may be effectively calculated based on the corresponding service history. Mathematically, the average time ($E_2$) taken by the service operator to greet and pay per customer is calculated according to a below relation:

$$E_2 = \frac{(\nabla t_c - \nabla t_s)}{N}$$

where $\nabla t_c$ refer to a difference in timestamp between two consecutive check-outs, $\nabla t_s$ refer to a difference in timestamp of last scan and first scan of the each customer, and N refer to number of customers served by the service operator.

In an embodiment, the average efficiency (E) of the service operator to provide the service for a single customer is determined based on an average time ($E_1$) taken by the service operator to process a service item, the average time ($E_2$) taken by the service operator to greet and pay of each customer, and the service items cart load factor (L) of the each customer, according to a below relation:

$$E = E2 + L*E1$$

In an embodiment, the service time (T) for the each customer is calculated based on the corresponding demographic factor (D), the corresponding senti-motional factor (S) and the average efficiency (E) of the service operator, according to a below relation:

$$T = E*D*S$$

At step 212 of the method 200, the one or more hardware processors 104 of the system 100 are configured to predict the wait time of the each queue of the plurality of queues, based on the service time of the plurality of customers currently waiting in the associated queue. In an embodiment, the wait time of the each queue is calculated by adding the service time (T) of each customer of the plurality of customers waiting in the associated queue at the given time, mathematically may be represented as:

$$T = \sum_{i=1}^{n} E_i \times D_i \times S_i$$

where, n denotes the number of the plurality of the customers waiting in the queue at the given time, $E_i$ denotes the average efficiency of the service operator for the customer i waiting in the queue at the given time, $D_i$ denotes the demographic factor of the customer i waiting in the queue at the given time, and $S_i$ denotes the senti-motional factor of the customer i waiting in the queue at the given time.

In an embodiment, the one or more hardware processors (104) of the system 100 are further configured to display the predicted wait time of the each queue of the plurality of queues, through a set of display units (not shown in FIG. 1). In an embodiment, the set of display units may be part of the system 100 or may be connected to the system 100 externally via the I/O interface(s) 106. In an embodiment, the set of display units may be installed near to the check-out area or at a place where the service counters are present or may be at multiple locations within the service area. In an embodiment, the each display unit of the set of display units may be configured to display the predicted wait times of the plurality of queues in a chronical or a sequential order. In an embodiment, the each display unit of the set of display units may be configured to display the queue having a least predicted wait time first in the display area.

In the embodiment of the present disclosure, the methods and systems predict wait times of the plurality of queues by considering factors including demographic factor (D) of the each customer and the senti-motional factor (S) of the each customer. Hence the predicted wait times of the plurality of queues may be accurate and effective. The customers may choose the queue having least wait time and may take informed decision hoping for faster check-out. Hence, customer experience and customer satisfaction may be increased to a great extent and this may results in attracting more customers to the service area.

On other side, the management of the service area may make informed decisions in managing the number of counters based on the predicted queue wait times of the plurality of the queues. For example, if the predicted wait time of one queue is more than a predefined wait time upper threshold, then a new counter may be added and the customers waiting in such queue may be advised to occupy the queue that is recently added. Similarly, the management may reduce number of counters, based on the predicted wait times of the plurality of the queues, for example, if the predicted wait time of one queue is less than a predefined wait time lower threshold. Hence the efficiency of the service area may be achieved. In an embodiment, for example, the predefined wait time upper threshold and the predefined wait time lower threshold are may be 60 mins and 5 mins respectively.

In some embodiments of the present disclosure, the estimated age of the each customer is considered for determining the demographic factor (D) of the each customer. But the demographic factor (D) of the each customer is not limited to the estimated age of the each customer.

In accordance with an embodiments of the present disclosure, the exemplary systems are methods are disclosed for predicting queue wait time of the plurality of the queues in the service area such as market places including retail stores and super markets. However the persons skilled in the art may exercise the present disclosure to other business areas including banks, hospitals, hotels, or a like where the service is provided, by modifying some of the embodiments. For example, in hospitals, a queue wait time may be predicted by predefining the service items cart load factor (L) of the customer to '1'.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein predicts accurate wait time of each queue of a plurality of queues at service area, by utilizing various visual cues of the customers such as age, gender, ethnicity of the customer and senti-motional state of the customers including positive attitude or negative attitude, happy state, sad state, and irritation state of the customer and so on. Hence, the customer shopping experience and satisfaction may be increased to a greater extent.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for predicting wait time of each queue of a plurality of queues at a service area, the method comprising:

receiving, via one or more hardware processors, an image of each queue of the plurality of queues, using at least one image acquisition device, wherein each queue comprises a plurality of customers waiting in at least one queue of a plurality of queues with associated service items cart for a service;

extracting, via the one or more hardware processors, a set of sub-images for each customer among the plurality of customers, from the received image of each queue, using a pre-trained deep learning based recognition model, wherein the set of sub-images for each customer comprises a face of the customer and the associated service items cart, wherein the pre-trained deep learning based recognition model recognizes the associated service items cart and maps the associated service items cart with the customer, wherein the pre-trained deep learning based recognition model includes a pre-built demographics prediction model to estimate age of the each customer and an accuracy age estimate factor, based on the face of the customer, and wherein the accuracy age estimate factor is a percentage defining the accuracy of the prediction of the pre-built demographics prediction model;

estimating, via the one or more hardware processors, visual cues of the plurality of customers such as the age, and a senti-motional state of each customer from the face of the customer comprised in the corresponding set of sub-images, and a number of service items from the associated service items cart present in the corresponding set of sub-images, using the pre-trained deep learning based recognition model, wherein the number of service items of the customer is estimated based on whether the associated service items cart is at least one of full, half-full and empty, and wherein the visual cues capture facts of the customer from the plurality of customers waiting in the plurality of queues in real-time;

determining, via the one or more hardware processors, a demographic factor (D) of each customer based on the corresponding estimated age, a senti-motional factor (S) of the each customer based on the corresponding estimated senti-motional state, and a service items cart load factor (L) of the each customer based on the estimated number of service items, wherein the demographic factor (D) of each customer is determined from a predefined set of demographic factors and each demographic factor of the predefined set of demographic factors is defined based on a predefined range of the estimated age, wherein the senti-motional factor (S) of each customer is determined from a predefined set of senti-motional factors and each senti-motional factor of the predefined set of senti-motional factors is defined based on a set of senti-motional states, wherein the set of senti-motional states includes a positive attitude and a negative attitude, wherein emotions of each customer include at least one of a happy state, a sad state and an irritation state, and wherein the service items cart load factor (L) of each customer is determined from a predefined set of service items cart load factors and each service items cart load factor of the predefined set of service items cart load factors is defined based on a predefined range of the estimated number of service items, and wherein the range of predefined set of demographic factors, the range of predefined set of senti-motional factors and the range of predefined set of service items cart load factors are defined based on historical transactions observed for a plurality of service areas;

calculating, via the one or more hardware processors, a service time (T) for each customer, based on the corresponding demographic factor (D), the corresponding senti-motional factor (S) and an average efficiency (E) of a service operator, wherein the average efficiency (E) of the service operator is determined, based on an average time ($E_1$) taken by the service operator to process a service item from a plurality of service items processed for the plurality of customers, an average time ($E_2$) taken by the service operator to greet and pay of each customer, and the service items cart load factor (L) of each customer; and predicting the wait time of each queue of the plurality of queues in real time, via the one or more hardware processors, based on the service time of the plurality of customers waiting in the associated queue for the service, wherein the wait time is predicted accurately by performing analysis of the prediction of wait time based on:

a queue in which the customer with a sad face and an irritation face takes more time than the customer with a happy face during a check-out process;

checking for the plurality of queues which are less crowded;

checking for the customers shopping a smaller number of shopping items than the customers shopping a greater number of shopping items and pay using a variety of modes of payment; and checking for the customers taking more time during the check-out process than the customers taking less time.

2. The method of claim 1, further comprises displaying the predicted wait time of each queue of the plurality of queues, through a set of display units, via the one or more hardware processors.

3. A system for predicting wait time of each queue of a plurality of queues at service area, the system comprising:

a memory storing instructions;

one or more communication interfaces;

at least one image acquisition devices; and one or more hardware processors coupled to the memory via the one or more communication interfaces, wherein the one or more hardware processors are configured by the instructions to:

receive an image of each queue of the plurality of queues, using the at least one image acquisition devices, wherein each queue comprises a plurality of customers waiting in at least one queue of a plurality of queues with associated service items cart for a service;

extract a set of sub-images for each customer among the plurality of customers, from the received image of each queue, using a pre-trained deep learning based recognition model, wherein the set of sub-images for each customer comprises a face of the customer and the associated service items cart, wherein the pre-trained deep learning based recognition model recognizes the associated service items cart and maps the associated service items cart with the customer, wherein the pre-trained deep learning based recognition model includes a pre-built demographics prediction model to estimate age of the each customer and an accuracy age estimate factor, based on the face of the customer, and wherein the accuracy age estimate factor is a percentage defining the accuracy of the prediction of the pre-built demographics prediction model;

estimate visual cues of the plurality of customers such as the age, and a senti-motional state of each customer from the face of the customer comprised in the corresponding set of sub-images, and a number of service items from the associated service items cart present in the corresponding set of sub-images, using the pre-trained deep learning based recognition model, wherein the number of service items of the customer is estimated based on whether the associated service items cart is at least one of full, half-full and empty, and wherein the visual cues capture facts of the customer from the plurality of customers waiting in the plurality of queues in real-time;

determine a demographic factor (D) of each customer based on the corresponding estimated age, a senti-motional factor (S) of each customer based on the corresponding estimated senti-motional state, and a service items cart load factor (L) of each customer based on the estimated number of service items, wherein the demographic factor (D) of each customer is determined from a predefined set of demographic factors and each demographic factor of the predefined set of demographic factors is defined based on a predefined range of the estimated age, wherein the senti-motional factor (S) of each customer is determined from a predefined set of senti-motional factors and each senti-motional factor of the predefined set of senti-motional factors is defined based on a set of senti-motional states, wherein the set of senti-motional states includes a positive attitude and a negative attitude, wherein emotions of each customer include at least one of a happy state, a sad state and an irritation state, and wherein the service items cart load factor (L) of each customer is determined from a predefined set of service items cart load factors and each service items cart load factor of the predefined set of service items cart load factors is defined based on a predefined range of the estimated number of service items, and wherein the range of predefined set of demographic factors, the range of predefined set of senti-motional factors and the range of predefined set of service items cart load factors are defined based on historical transactions observed for a plurality of service areas;

calculate a service time (T) for each customer, based on the corresponding demographic factor (D), the corresponding senti-motional factor (S) and an average efficiency (E) of a service operator, wherein the average efficiency (E) of the service operator is determined, based on an average time ($E_1$) taken by the service operator to process a service item from a plurality of service items processed for the plurality of customers, an average time ($E_2$) taken by the service operator to greet and pay of each customer, and the service items cart load factor (L) of each customer; and predict the wait time of each queue of the plurality of queues in real time, based on the service time of the plurality of customers waiting in the associated queue for the service wherein the wait time is predicted accurately by performing analysis of the prediction of wait time based on:

a queue in which the customer with a sad face and an irritation face takes more time than the customer with a happy face during a check-out process;

checking for the plurality of queues which are less crowded;

checking for the customers shopping a smaller number of shopping items than the customers shopping a greater number of shopping items and pay using a variety of modes of payment; and checking for the customers taking more time during the check-out process than the customers taking less time.

4. The system of claim 3, wherein the one or more hardware processors are further configured by the instructions to display the predicted wait time of each queue of the plurality of queues, through a set of display units.

5. A computer program product comprising a non-transitory computer readable medium having a computer readable program embodied therein, wherein the computer readable program, when executed on a computing device, causes the computing device to:

receive an image of each queue of the plurality of queues, using at least one image acquisition devices, wherein each queue comprises a plurality of customers waiting in at least one queue of a plurality of queues with associated service items cart for a service;

extract a set of sub-images for each customer among the plurality of customers, from the received image of each queue, using a pre-trained deep learning based recognition model, wherein the set of sub-images for each customer comprises a face of the customer and the associated service items cart, wherein the pre-trained deep learning based recognition model recognizes the associated service items cart and maps the associated service items cart with the customer, wherein the pre-trained deep learning based recognition model includes a pre-built demographics prediction model to estimate age of the each customer and an accuracy age estimate factor, based on the face of the customer, and wherein the accuracy age estimate factor is a percentage defining the accuracy of the prediction of the pre-built demographics prediction model;

estimate visual cues of the plurality of customers such as the age and a senti-motional state of each customer from the face of the customer comprised in the corresponding set of sub-images, and a number of service items from the associated service items cart present in the corresponding set of sub-images, using the pre-trained deep learning based recognition model, wherein the number of service items of the customer is estimated based on whether the associated service items cart is at least one of full, half-full and empty, and wherein the visual cues capture facts of the customer from the plurality of customers waiting in the plurality of queues in real-time;

determine a demographic factor (D) of each customer based on the corresponding estimated age, a senti-motional factor (S) of each customer based on the corresponding estimated senti-motional state, and a service items cart load factor (L) of each customer based on the estimated number of service items, wherein the demographic factor (D) of each customer is determined from a predefined set of demographic factors and each demographic factor of the predefined set of demographic factors is defined based on a predefined range of the estimated age, wherein the senti-motional factor (S) of each customer is determined from a predefined set of senti-motional factors and each senti-motional factor of the predefined set of senti-motional factors is defined based on a set of senti-motional states, wherein the set of senti-motional states includes a positive attitude and a negative attitude, wherein emotions of each customer include at least one of a happy state, a sad state and an irritation state, and wherein the service items cart load factor (L) of each customer is determined from a predefined set of service items cart load factors and each service items cart load factor of the predefined set of service items cart load factors is defined based on a predefined range of the estimated number of service items, and wherein the range of predefined set of demographic factors, the range of predefined set of senti-motional factors and the range of predefined set of service items cart load factors are defined based on historical transactions observed for a plurality of service areas;

calculate a service time (T) for each customer, based on the corresponding demographic factor (D), the corresponding senti-motional factor (S) and an average efficiency (E) of a service operator, wherein the average efficiency (E) of the service operator is determined, based on an average time ($E_1$) taken by the service operator to process a service item from a plurality of service items processed for the plurality of customers, an average time ($E_2$) taken by the service operator to greet and pay of each customer, and the service items cart load factor (L) of each customer; and predict the wait time of each queue of the plurality of queues in real time, based on the service time of the plurality of customers waiting in the associated queue for the service wherein the wait time is predicted accurately by performing analysis of the prediction of wait time based on:
- a queue in which the customer with a sad face and an irritation face takes more time than the customer with a happy face during a check-out process;
- checking for the plurality of queues which are less crowded;
- checking for the customers shopping a smaller number of shopping items than the customers shopping a greater number of shopping items and pay using a variety of modes of payment; and
- checking for the customers taking more time during the check-out process than the customers taking less time.

* * * * *